Aug. 30, 1938.　　F. KAHN ET AL　　2,128,462

THERMOCOUPLE HYGROMETER

Filed April 16, 1934

INVENTORS.
Frank Kahn
Edward R. Wayne
BY
Frank Kahn
ATTORNEY.

Patented Aug. 30, 1938

2,128,462

UNITED STATES PATENT OFFICE 2,128,462

THERMOCOUPLE HYGROMETER

Frank Kahn and Edward R. Wayne, Philadelphia, Pa.; said Wayne assignor to Albert F. Wayne, Jr., Philadelphia, Pa.

Application April 16, 1934, Serial No. 720,698

4 Claims. (Cl. 73—338)

This invention relates to temperature measuring devices, and, more particularly, relates to a thermocouple hygrometer.

Where accuracy is desired, relative humidity is determined by interpolation of charts or by calculations, from simultaneous measurements of temperatures of air and of the surface of water over which the same air is rapidly passed. The latter temperature is known as the temperature of evaporation, or the wet-air temperature. The standard instrument of reference for these measurements is the sling psychrometer, an apparatus in which two thermometers in a sling are caused to be whirled rapidly in the air for which a determination of relative humidity is desired. One of the two thermometers is of the ordinary type with thin glass bulb while the other is similar but has its bulb encased in a moistened wick, and its readings are known as the "wet bulb" or wet-air temperatures. The simultaneous readings of the wet-air thermometer, and of the other, the "dry bulb" or dry-air thermometer, permit a determination of relative humidity by reference to standard hygrometer tables, charts, or formulae.

It is easily seen that the process of manually whirling the sling psychrometer is slow and laborious, is subject to error and risk of breakage of thermometers, and the device itself is not adaptable to automatic recording of readings. Heretofore, to overcome these defects, resistance thermometers have been utilized, one of two being provided with a wick and both being placed in a stream of air whose relative humidity is desired. These resistance thermometers have been connected to suitable temperature recorders or other recording devices, from whose records the relative humidities of the air could be determined for any desired time. However, resistance thermometers are relatively bulky, the wicks necessary for the wet-air thermometer being correspondingly large, and the volume of water necessary to keep the wicks constantly moist being so great as to require a continuously running or often replenished supply. Hygrometers of this type are large, heavy, clumsy, and require frequent servicing. These devices, also, are inaccurate, are difficult to keep in satisfactory operating condition, and require a specially-guided stream of air over the wet-air thermometer.

The primary object of our invention is to provide a recording hygrometer in which these defects are overcome.

Another object of our invention is to provide a wet-air thermocouple.

Still another object of our invention is to provide a wet-air thermocouple in which the measuring junction is maintained substantially at the wet-air temperature.

A further object of our invention is to produce an automatic hygrometer which is accurate, occupies a minimum of space, requires very little water, and needs practically no attention or servicing.

Still a further object of our invention is to provide an improved device of the character described, of simple, cheap, and efficient construction, having a maximum efficiency.

With these and other objects in view, which will become apparent as the description proceeds, our invention is embodied in a temperature recording system consisting essentially of two thermocouples located in a stream of air whose relative humidity is desired to be known and suitably connected to a potential recording device, one thermocouple being of the ordinary type and the other being a wet-air thermocouple comprising a junction of two metallic conductors having different thermoelectric powers, embedded within a heat-controlling metallic member, said metallic member being closely enclosed within a wet wick and the heat conductance of said conductors being very small compared with that of said member.

The invention, both as to details of construction and combination of parts, will best be understood from the following description of a specific embodiment which we illustrate as an example, when read in connection with the accompanying drawing, in which.

Figure 1:
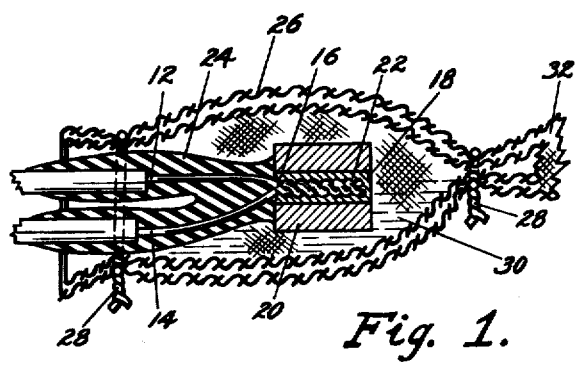
Fig. 1 is a sectional elevational view of our wet-air thermocouple.

Referring now to the drawing, we have shown in Fig. 1 an embodiment of our invention which illustrates the principle of our wet-air thermocouple. Consider a wet-air thermocouple constructed according to Fig. 1, in which a metal wire or conductor 12 is united with another conductor 14 of different metal to form a temperature-sensitive measuring junction 16, the conductors 12 and 14 being twisted together for a few turns beyond said junction. This twisted portion lies within a cylindrical bore 18 of a metal cylinder, block, or member 20, and the junction 16 is placed in a thermally-conducting heat-interchanging relationship with said member 20 by filling the space between the twisted portion of said conductors and member 20 with solder or other solidified metal 22. An electrically-insulating cement or other electrically-insulating water-impervious material 24 surrounds the conductors 12 and 14 outwardly from the junction 16 for a short distance. A cloth wick 26 is wrapped about the member 20, the junction 16, and part of the cement-covered portions of conductors 12 and 14, and is secured by twisted loops of wire 28 on either side of the member 20.

Let the wick be saturated with water and a stream of air be forced over the assembly. The temperature of the outer wet surface of the wick thereupon is reduced by evaporation of the water to the temperature of evaporation, or wet-air temperature, $T_w$. Heat thereupon flows by conduction from the member 20 through the water 30 permeating wick 26 and the interstices between said member and wick. The temperature of the surface of member 20 is thus reduced to some new temperature $T_m$, higher than $T_w$. Heat will now flow into the member 20 through the conductors 12 and 14, whose outer extremities are at the dry-air temperature, $T_d$, with the result that the junction 16 will be at a temperature $T_j$, intermediate of temperatures $T_d$ and $T_m$. Equilibrium will be established with a conduction flow of a constant quantity of heat Q from the outer extremities of conductors 12 and 14 to the wet surface of the wick, where it will be removed by evaporation of water into the air stream.

Let the heat conductances of the heat paths be represented as follows:

$K_{12}$ = heat conductance of conductor 12
$K_{14}$ = heat conductance of conductor 14
$K_m$ = heat conductance of member 20 from junction 16 to wick 26
$K_w$ = heat conductance from outer surface of member 20 to outer surface of the water-saturated wick.

Let time be represented by the symbol $t$. Then the rate of heat flow from the conductors through the thermocouple to the air stream, is:

$$Q/t = K_{12}(T_d - T_j) + K_{14}(T_d - T_j) =$$
$$(K_{12} + K_{14})(T_d - T_j) \quad (1)$$
$$= K_m(T_j - T_m) \quad (2)$$
$$= K_w(T_m - T_w) \quad (3)$$

Solving the above equations simultaneously for $T_j$, we obtain $$T_j = \frac{T_w - (K_{12} + K_{14})(1/K_w + 1/K_m)T_d}{1 - (K_{12} + K_{14})(1/K_w + 1/K_m)} \quad (4)$$

The E. M. F. at the "cold" or outer junction of the conductors 12 and 14 (not illustrated in the drawing) is a well-known function of the temperature of the junction, $T_j$. To the extent that the temperature $T_j$, measured by the thermocouple, is greater than the wet-air temperature $T_w$, the wet-air temperature reading of the thermocouple will be in error.

From Equation (4), above, it is at once seen that $T_j$ cannot equal $T_w$, for in that case $K_{12}$ plus $K_{14}$ must equal zero, or $K_w$ and $K_m$ must each be infinite, either of which conditions is a physical impossibility. The values for $K_{12}$ and $K_{14}$ can be made quite small, of course, but the minimum is limited by the electric conductance required to obtain the sensitivity of measurement desired. The constants $K_w$ and $K_m$ cannot, of course, be made to equal infinity, but their magnitudes may be increased practically to an extent such that the right-hand term of Equation (4) reduces to $T_w$ within any desired practical degree of error.

$K_w$ may be increased by reducing the thickness of the wick and by making the wick fit snugly over a metallic surface. The value of $K_w$ varies directly as the area of such surface, and thus can be increased indefinitely by increase in such area. $K_m$ may be suitably increased by choosing a metal of high heat conductivity and by using a large cross-section of heat-flow path to junction 16.

It is clear from the foregoing that by choosing any desired values of $K_w$ and $K_m$, the flow of heat from the thermocouple junction to the wick can be suitably controlled.

Figure 2:
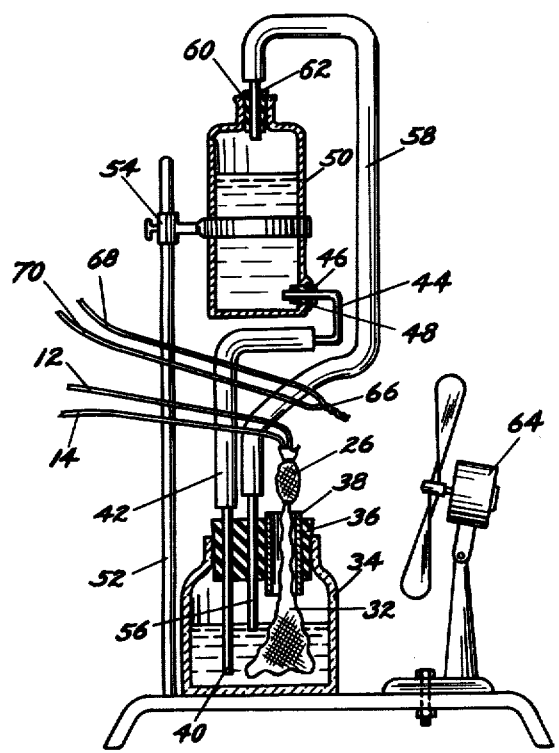
Fig. 2 is a fragmentary elevational view, partly in section, of a wet-air and dry-air thermocouple assembly with fan and moisture reservoirs.

Referring now to Fig. 2, the wet-air thermocouple of Fig. 1 is shown with the end 32 of wick 26 extended into a water reservoir 34. The reservoir 34 consists of a short wide-mouthed bottle and is provided with a stopper 36 through which extends a tube 38 providing ingress for the wick 26. A tube 40 extending to a point adjacent the bottom of the reservoir 34 and through the stopper 36 is connected by a flexible tube 42 to a tube 44 inserted through a stopper 46 in an opening 48 at the bottom of a main water reservoir 50 mounted vertically above reservoir 34 on a stand 52, by a clamp 54. A tube 56 similarly connects the upper space of the reservoir 34 and the top of the main reservoir 50 by way of a flexible tube 58, through a top opening 60 in reservoir 50 and a stopper 62 therein inserted.

A fan 64 is mounted in such manner that the stream of air directed by the outer portion of its blades impinges on the wet-air thermocouple. A dry-air thermocouple 66, of the usual construction, is mounted at the same distance from the fan blades as the wet-air thermocouple, but in such position that it receives the air impelled by the blade opposite that which forces air over the wet-air thermocouple. In each case, care is taken to insure that the air heated by passage through the fan motor does not impinge on the thermocouples. Conductors 68 and 70 of thermocouple 66, and conductors 12 and 14 are led either to appropriate indicating or recording voltmeters, or to indicating or recording potentiometers (not illustrated).

The operation of the device is as follows: Water is placed into the reservoir 50, the tube 42 being pinched meanwhile so that reservoir 34 will not be flooded. The stopper 62 is then replaced in the top opening 60 and the tube 42 is released, whereupon the reservoir 34 fills to a point slightly above the opening leading into tube 56 in said reservoir 34 and is continuously maintained at that level until reservoir 50 is emptied. The fan 64 is started and thereupon projects a stream of air over the thermocouples, the dry-air thermocouple registering the actual temperature of the air stream. In the case of the wet-air thermocouple the stream of air from the fan evaporates water from the wet wick 26 and in doing so extracts heat therefrom, thus reducing the temperature of the wet surface of the wick to $T_w$. Due to the difference in temperature $T_w$ of the water surface and the initial temperature $T_d$ of the entire system, heat flows from the conductors 12 and 14, through the member 20, and through the moisture-saturated wick 26 to the wet surface from which the heat is being extracted by the air stream. After steady state has been reached, i. e., after the excess heat stored in the system has been removed, equilibrium temperatures will be reached, in which, in our wet-air thermocouple, the temperature $T_j$, which determines the E. M. F. generated, is substantially the same as $T_w$, as heretofore explained.

A wet-air thermocouple constructed according to Fig. 1, in which the member 20 was of copper and of mass approximately 2 grams, and the thermocouple conductors 12 and 14 were of copper and of constantan respectively of No. 28 A. W. G., gave satisfactorily accurate determinations of relative humidity as compared with simultaneous averaged readings with a sling psychrometer. As the purpose of the small gage conductors is to prevent heat conduction to the wet-air thermocouple, these conductors need not be limited to such small size for any great length, and at a distance of a few inches from the thermocouple it is recommended that they be connected to conductors of larger gage to convey the electrical potential to the recording or indicating device, so that electrical sensitivity of the system be not impaired.

Although the member 20 has been illustrated in Fig. 1 as of cylindrical shape, it may instead be of any desired shape, a form which permits better and more uniform contact with the wick, such as a spheroid, being even more desirable than that illustrated. Furthermore, as the heat conductance $K_w$ is probably less susceptible of being easily increased to a particular desired magnitude than the heat conductance $K_m$, it is quite feasible to obtain desired large values of these quantities without disproportionately increasing the mass of the member, by making said member hollow and providing it with heat conducting struts or ribs converging to the thermocouple junction located within said member.

Although the dry-air thermocouple 66 is shown as symmetrical to the wet-air thermocouple with respect to the fan-propelled air stream, the system will operate with equal effectiveness if the thermocouple 66 be placed anywhere in the said air stream except in that portion heated by the fan motor or very close or to leeward of the wet-air thermocouple. There is no error introduced by placing the dry-air thermocouple 66 in a direct line with and between the fan and the wet-air thermocouple.

The hygrometer system of Fig. 2 is merely representative, and may be variously assembled, for example, the wet-air and dry-air thermocouples may be placed in a duct or flue of moving air instead of before a fan.

Although the invention has been described in considerable detail, such description is intended as illustrative rather than limiting, as numerous embodiments will be apparent to those skilled in the art. Our invention, therefore, is not to be limited except insofar as is necessitated by the prior art or by the spirit of the appended claims.

We claim:

1. In a hygrometer, a wet-air unit comprising an evaporative envelope adapted to be subjected to standard evaporating conditions, a thermocouple unit enclosed within said envelope, said thermocouple unit including a heat conductive body enveloping the thermocouple junction, said body being proportioned to the evaporative properties of the envelope such that the heat conducted into the interior of said envelope by the elements of said thermocouple is removed rapidly enough to maintain the temperature of the thermocouple junction substantially the same as that of the surface of said envelope.

2. In a hygrometer, a wet-air unit comprising an evaporative envelope adapted to be subjected to standard evaporating conditions, a thermocouple unit enclosed within said envelope, said thermocouple unit including a heat conductive body arranged in thermally conductive relation to the thermocouple junction, said body being proportioned to the evaporative properties of the envelope such that the thermocouple junction is cooled substantially to the true wet-air temperature of the surface of the envelope.

3. In a hygrometer, a wet-air unit comprising an evaporative envelope adapted to be subjected to standard evaporating conditions, a thermocouple unit enclosed within said envelope, said thermocouple unit including a thermocouple junction, a heat dissipating element and a pair of leads, said leads constituting the sole means by which heat is introduced into the interior of said envelope, and said element being proportioned to the evaporative properties of the envelope such that the heat conducted into the interior of said envelope by said leads is removed rapidly enough to maintain the temperature of the thermocouple junction substantially the same as that of the surface of said envelope.

4. In a hygrometer, a wet air-unit comprising an evaporative envelope adapted to be subjected to standard evaporating conditions and a thermocouple unit enclosed within said envelope, the leads of said thermocouple unit constituting the sole means by which heat is introduced into the interior of said envelope, and the thermocouple unit and the thermal conductance of said leads being proportioned to the evaporative properties of the envelope such that the heat conducted into the interior of said envelope by sail leads is removed rapidly enough to maintain the temperature of the thermocouple junction substantially the same as that of the surface of said envelope

FRANK KAHN.
EDWARD R. WAYNE.

CERTIFICATE OF CORRECTION.

Patent No. 2,128,462.                                 August 30, 1938.

FRANK KAHN, ET AL.

It is hereby certified that error appears in the printed specification of the above numbered patent requiring correction as follows: Page 3, second column, line 50, claim 4, for the word "sail" read said; and that the said Letters Patent should be read with this correction therein that the same may conform to the record of the case in the Patent Office.

Signed and sealed this 25th day of October, A. D. 1938.

Henry Van Arsdale (Seal)                                         Acting Commissioner of Patents.

to Fig. 1, in which the member 20 was of copper and of mass approximately 2 grams, and the thermocouple conductors 12 and 14 were of copper and of constantan respectively of No. 28 A. W. G., gave satisfactorily accurate determinations of relative humidity as compared with simultaneous averaged readings with a sling psychrometer. As the purpose of the small gage conductors is to prevent heat conduction to the wet-air thermocouple, these conductors need not be limited to such small size for any great length, and at a distance of a few inches from the thermocouple it is recommended that they be connected to conductors of larger gage to convey the electrical potential to the recording or indicating device, so that electrical sensitivity of the system be not impaired.

Although the member 20 has been illustrated in Fig. 1 as of cylindrical shape, it may instead be of any desired shape, a form which permits better and more uniform contact with the wick, such as a spheroid, being even more desirable than that illustrated. Furthermore, as the heat conductance $K_w$ is probably less susceptible of being easily increased to a particular desired magnitude than the heat conductance $K_m$, it is quite feasible to obtain desired large values of these quantities without disproportionately increasing the mass of the member, by making said member hollow and providing it with heat conducting struts or ribs converging to the thermocouple junction located within said member.

Although the dry-air thermocouple 66 is shown as symmetrical to the wet-air thermocouple with respect to the fan-propelled air stream, the system will operate with equal effectiveness if the thermocouple 66 be placed anywhere in the said air stream except in that portion heated by the fan motor or very close or to leeward of the wet-air thermocouple. There is no error introduced by placing the dry-air thermocouple 66 in a direct line with and between the fan and the wet-air thermocouple.

The hygrometer system of Fig. 2 is merely representative, and may be variously assembled, for example, the wet-air and dry-air thermocouples may be placed in a duct or flue of moving air instead of before a fan.

Although the invention has been described in considerable detail, such description is intended as illustrative rather than limiting, as numerous embodiments will be apparent to those skilled in the art. Our invention, therefore, is not to be limited except insofar as is necessitated by the prior art or by the spirit of the appended claims.

We claim:

1. In a hygrometer, a wet-air unit comprising an evaporative envelope adapted to be subjected to standard evaporating conditions, a thermocouple unit enclosed within said envelope, said thermocouple unit including a heat conductive body enveloping the thermocouple junction, said body being proportioned to the evaporative properties of the envelope such that the heat conducted into the interior of said envelope by the elements of said thermocouple is removed rapidly enough to maintain the temperature of the thermocouple junction substantially the same as that of the surface of said envelope.

2. In a hygrometer, a wet-air unit comprising an evaporative envelope adapted to be subjected to standard evaporating conditions, a thermocouple unit enclosed within said envelope, said thermocouple unit including a heat conductive body arranged in thermally conductive relation to the thermocouple junction, said body being proportioned to the evaporative properties of the envelope such that the thermocouple junction is cooled substantially to the true wet-air temperature of the surface of the envelope.

3. In a hygrometer, a wet-air unit comprising an evaporative envelope adapted to be subjected to standard evaporating conditions, a thermocouple unit enclosed within said envelope, said thermocouple unit including a thermocouple junction, a heat dissipating element and a pair of leads, said leads constituting the sole means by which heat is introduced into the interior of said envelope, and said element being proportioned to the evaporative properties of the envelope such that the heat conducted into the interior of said envelope by said leads is removed rapidly enough to maintain the temperature of the thermocouple junction substantially the same as that of the surface of said envelope.

4. In a hygrometer, a wet air-unit comprising an evaporative envelope adapted to be subjected to standard evaporating conditions and a thermocouple unit enclosed within said envelope, the leads of said thermocouple unit constituting the sole means by which heat is introduced into the interior of said envelope, and the thermocouple unit and the thermal conductance of said leads being proportioned to the evaporative properties of the envelope such that the heat conducted into the interior of said envelope by sail leads is removed rapidly enough to maintain the temperature of the thermocouple junction substantially the same as that of the surface of said envelope

FRANK KAHN.
EDWARD R. WAYNE.

CERTIFICATE OF CORRECTION.

Patent No. 2,128,462.                            August 30, 1938.

FRANK KAHN, ET AL.

It is hereby certified that error appears in the printed specification of the above numbered patent requiring correction as follows: Page 3, second column, line 50, claim 4, for the word "sail" read said; and that the said Letters Patent should be read with this correction therein that the same may conform to the record of the case in the Patent Office.

Signed and sealed this 25th day of October, A. D. 1938.

Henry Van Arsdale (Seal)                                            Acting Commissioner of Patents.